United States
Anthon

4,192,995
Mar. 11, 1980

[54] PHOTOMETRIC TESTING APPARATUS USING SHAPED DIFFUSER AND LIGHT BEAM HAVING A SPATIALLY ILL-DEFINED ENERGY DISTRIBUTION

[75] Inventor: Erik W. Anthon, Santa Rosa, Calif.

[73] Assignee: Optical Coating Laboratory, Inc., Santa Rosa, Calif.

[21] Appl. No.: 879,149

[22] Filed: Feb. 21, 1978

[51] Int. Cl.$^2$ .................... G01J 1/00; G01N 21/00; G02B 13/20
[52] U.S. Cl. .................... 250/338; 250/341; 250/347; 356/72; 356/73; 350/188
[58] Field of Search .............. 250/338, 340, 341, 334, 250/347; 356/51, 72, 73, 153, 219, 209, 206; 350/188; 128/303.1

[56] References Cited
U.S. PATENT DOCUMENTS

| | | | |
|---|---|---|---|
| 3,096,767 | 7/1963 | Gresser et al. | 356/219 |
| 3,302,016 | 1/1967 | Larrabura | 350/188 |
| 3,516,746 | 6/1970 | Shibata et al. | 356/96 |
| 3,687,519 | 8/1972 | Mapes | 356/209 |
| 3,743,430 | 7/1973 | Riggs | 356/206 |
| 3,770,355 | 11/1973 | Anthon | 250/341 |
| 3,832,061 | 8/1974 | Smith et al. | 356/204 |
| 4,027,973 | 6/1977 | Kaye | 356/73 |
| 4,123,143 | 10/1978 | Yachin et al. | 128/303.1 |

OTHER PUBLICATIONS

Jacobus et. al., "Visible Light-Emitting Diode", IBM Technical Disclosure Bulletin, vol. 10, No. 8, 1-68.

*Primary Examiner*—Alfred E. Smith
*Assistant Examiner*—Carolyn E. Fields
*Attorney, Agent, or Firm*—Flehr, Hohbach, Test, Albritton & Herbert

[57] ABSTRACT

A testing apparatus for making photometric measurements of transmission and reflectance of large parts uses a light beam having a spatially ill-defined energy distribution. A detector for receiving the light beam has a spatial variation in its sensitivity over its sensing area. A diffuser is provided which is disposed in the light beam for intercepting the light beam before it strikes the detector. The diffuser is formed of a white-like plastic and has a thickness which decreases progressively towards the outer edges of the same to compensate for the fall-off in sensitivity of the detector to rays closer to the outer margins of the diffuser or away from the center of the diffuser. The diffuser is formed in two portions in which a portion of the diffuser is in substantially closer proximity to the detector than the other portion to minimize the directional sensitivity of the detector.

The apparatus uses an invisible beam which is aimed by a coaxial visible beam. Measurements of transmission and reflectance are made in quick succession by moving the sample on a carriage and using a movable mirror assembly. The invisible beam is aimed separately for each of the two measurements.

16 Claims, 4 Drawing Figures

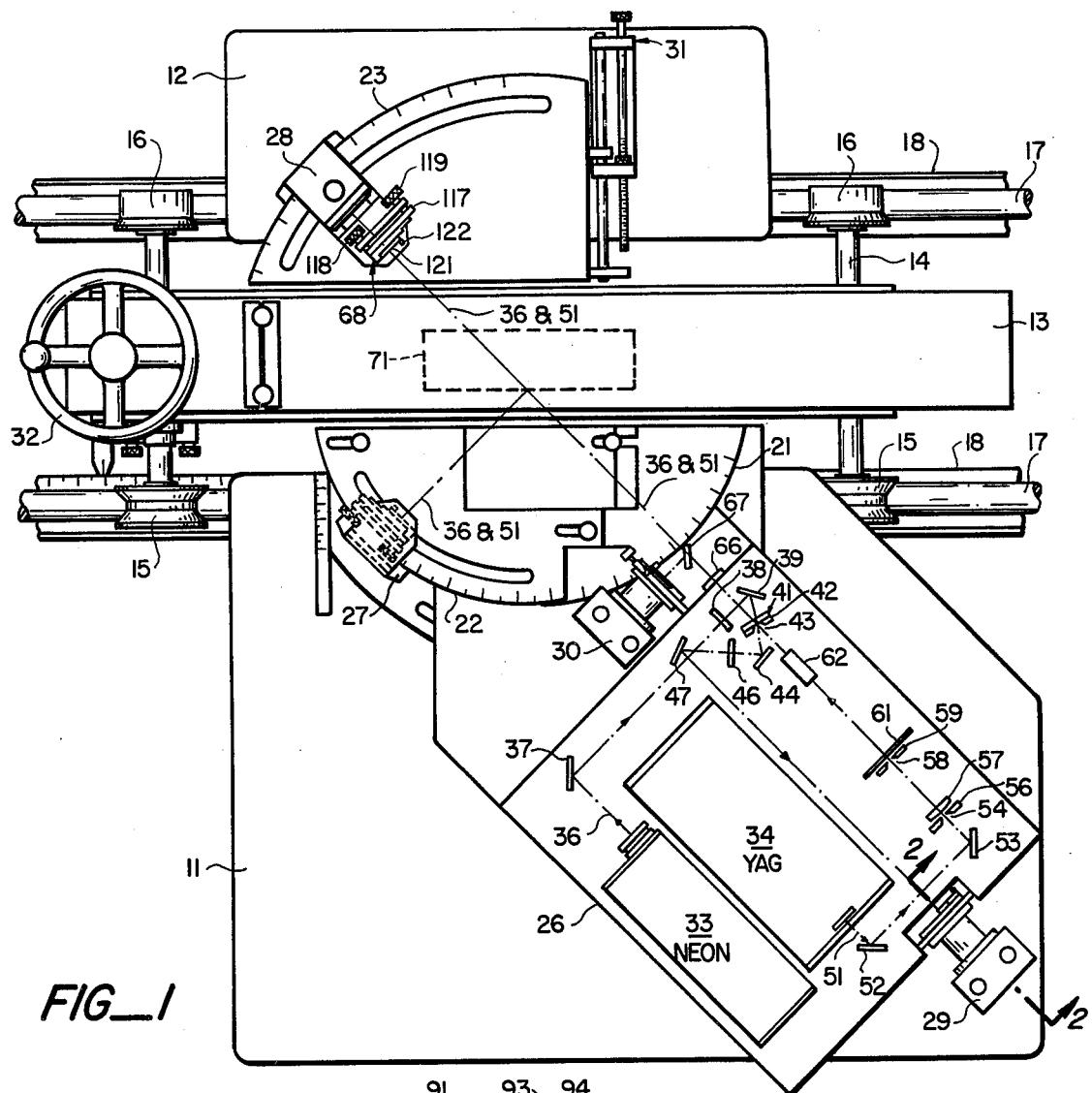
FIG_1
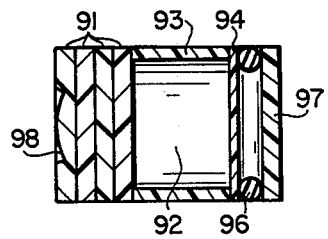
FIG_4
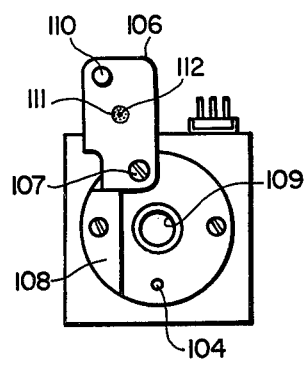
FIG_3
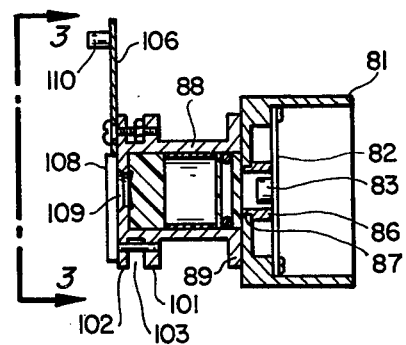
FIG_2

PHOTOMETRIC TESTING APPARATUS USING SHAPED DIFFUSER AND LIGHT BEAM HAVING A SPATIALLY ILL-DEFINED ENERGY DISTRIBUTION

BACKGROUND OF THE INVENTION

In the past there has been a problem of making accurate photometric measurements with laser beams. Problems have occurred because the sensitivity of the detectors utilized for photometric measurements is not constant across the active area of the detector. The detectors have also been direction sensitive. Another problem has been encountered because the energy in the laser beam, particularly in neodymium-YAG laser, is not equally distributed over the cross section of the beam and in that the energy distribution varies rapidly with time. For these reasons, accurate photometric measurements with the laser beam cannot be made either by sampling a part of the beam cross section or by capturing the whole beam within the active area of the detector. Attempts to solve these problems have included the use of a frosted glass diffuser in front of the detector. However, this has not been found to be satisfactory because the coherent nature of the laser beam causes the frosted glass to produce a speckled pattern instead of an evenly distributed beam. Spectrophotometers heretofor provided cannot handle large parts. Also in such devices no provision has been made to compensate for offsets in the beam due to refraction. There is, therefore, a need to provide a laser testing apparatus which overcomes these problems.

SUMMARY OF THE INVENTION AND OBJECTS

The testing apparatus for making photometric measurements uses a light beam which has spatially an ill-defined energy distribution. A detector receives the light beam. The detector has a spatial variation in the sensitivity over its sensing area. A diffuser intercepts the light beam before it strikes the detector. The diffuser is formed of a white-like plastic material. The diffuser has a thickness which decreases progressively towards the outer edges to compensate for fall off in sensitivity of the detector towards its outer margin. A portion of the diffuser is separated from another portion of the diffuser so that the first named portion is substantially closer to the detector than the other portion to minimize directional sensitivity of the detector.

In general, it is an object of the present invention to provide a testing apparatus in which it is possible to provide much more accurate photometric measurements using a light beam having a spatially ill-defined energy distribution.

Another object of the invention is to provide an apparatus of the above character which makes it possible to obtain electrical signals that are accurately proportional to the energy in the light beam.

Another object of the invention is to provide an apparatus of the above character in which it is possible to measure the transmission and reflectance of large parts.

Additional objects and features of the invention will appear from the following description.

BRIEF DESCRIPTION OF THE DRAWINGS

FIG. 1 is a top plan view of a testing apapratus incorporated in the present invention.

FIG. 2 is a cross sectional view taken along line 2—2 of FIG. 1 showing in particular a detector assembly.

FIG. 3 is a view looking along the line 3—3 of FIG. 2.

FIG. 4 is an enlarged portion of diffusers and band pass filter shown in FIG. 2.

DESCRIPTION OF THE PREFERRED EMBODIMENT

The photometric testing apparatus as shown in FIG. 1 of the drawings consists of front and rear platforms 11 and 12. A carriage 13 is mounted upon a pair of spaced parallel shafts 14 which have rollers 15 and 16 mounted thereon. The rollers are adapted to travel upon spaced parallel rods 17. The rods 17 are mounted upon a framework 18 which is generally in the form of a table so as to support the front and rear platforms 11 and 12 at approximately table height.

First, second and third protractors 21, 22 and 23 are provided. The first protractor 21 carries a laser head 26. It is adjustable for angles of incidence ranging from zero to 60°. The second protractor 22 carries a bracket 27 which also can be shifted to a suitable angle, as for example from zero to 60°. The laser head 26 carries a reference detector assembly 29 and a test or signal detector assembly 30.

A thumb screw assembly 31 is provided for offsetting the rear protractor 23 to compensate for beam deviation caused by refraction when measuring transmission in very thick parts.

The laser head 26 carries first and second lasers 33 and 34 which are mounted thereon. By way of example, the laser 33 can be a helium neon laser having a visible light beam of a wavelength of 630 nanometers whereas the second laser 34 can be neodymium-YAG laser having an invisible beam of a wavelength of 1,065 manometers. The lasers 33 and 34 are of conventional types.

The visible laser or light beam 36 produced by the laser 33 is reflected through a 90° angle by a mirror 37. The beam then travels through a lens 38. The laser beam 36 then strikes a mirror 39 which directs the light through a beam splitter-combiner 41. The beam splitter-combiner 41 can be of a suitable type having 30% transmission and 30% reflection. A member 42 is associated with the beam splitter-combiner 41 and is provided with an aperture 43. The portion of the laser beam 36 passing through the beam splitter 41 passes through the aperture 43 and strikes a mirror 44. The mirror 44 directs the laser beam through a lens 46. The laser beam then strikes a mirror 46 and is then directed towards the reference detector assembly 29.

The laser beam 51 which is produced by the laser 34 is reflected by mirror 52 onto another mirror 53. The laser beam is then directed through an aperture 54 of a member 56 and then passes through a lens 57. The beam then passes through another aperture 58 in a member 59. A chopper disc 61 is disposed in close proximity to the member 59 and is provided for chopping the beam passing through the aperture 58. A 510 cycle chopping rate is produced by utilizing a chopper disc 61 having 17 holes and rotating at 1800 RPM. The lens 57 focuses the beam down to a small point at the aperture 58 so that the aperture 58 will remove all rays which deviate too far from the main laser beam 51. After the beam has passed through its focal point, it spreads out again and passes through a polarizer 62. The polarizer 62 is formed of a suitable material such as calcite and is utilized for selecting the polarization orientation desired for the measurement being made. The main beam then passes through the aperture 43 and then through the beam splitter-combiner 41. A portion of the laser beam 51 is reflected from the beam splitter-combiner 41 onto the mirror 44. The beam then passes through the collimating lens 46 and is reflected by the mirror 47 onto the reference detector 29.

The portion of the laser beam 51 which passes through the beam splitter-combiner 41 is combined with the portion of the laser beam 36 which is reflected by the beam splitter-combiner 41 and thereafter the two beams travel coaxially for purposes hereinafter described. This combined beam passes through a lens 66 which maintains the cross sectional area of the combined beams relatively constant for a substantial distance beyond the lens 66. The coaxially aligned combined beams then pass below the mirror 67 and are ready to be used in a testing operation using a movable mirror assembly 68 in conjunction with a test part 71.

The test detector assemblies 29 and 30 each consists of a housing 81. A printed circuit board 82 is mounted within the housing and has mounted thereon a photoconductive detector 83. The detector 83 is of a conventional type such as a photoconductive piece of silicon. It is connected to conventional electronics (not shown) provided within the housing 81. The detector 83 is seated within the collar 86 mounted in the aperture 87 provided in the housing. A sleeve 88 is secured to the housing 81 through a flange 89 provided on the sleeve.

Laser beam diffusing means is provided within the sleeve and is formed of a milky white or white-like plexiglass produced by Rohm & Haas, type W2447. It is believed preferable to have the diffusing means be in the form of a diffusion member 91 having a thickness of approximately ¼ inch. As can be seen, the diffuser 91 is mounted in the front extremity of the sleeve 88. To the rear of the diffuser 91 there is provided a space 92 which space is maintained by cylindrical spacer 93. To the rear of the spacer 93 there is provided a band pass filter 94. The band pass filter 94 is designed so it only passes the wavelengths of the laser beams of interest and will be totally blind to the surrounding light. In other words, the filter ensures that the testing apparatus will not be confused by ambient light. An O-ring 96 is provided immediately to the rear of the band pass filter so that the filter will not be crushed. Another diffuser 97 is placed to the rear of the O-ring 96 and is positioned in such a manner so that it is in relatively close proximity to the detector 83. It is formed of the same material as the diffuser 91 but has a thickness which is substantially less than the diffuser 91.

As can be seen from FIG. 4, in order to enhance the capability of the diffuser as hereinafter described, a spherical surface 98 is formed on the diffuser. By way of example, this can be accomplished by machining the spherical surface onto the block forming the diffuser 91 and then polishing the same. With such a configuration it can be seen that the thickness of the diffuser decreases progressively towards the outer edge or margin of the effective area of the same. This curvature is designed to compensate for the fall off in detector sensitivity towards the outer margin of the aperture.

It should be appreciated that although the spherical surface 98 has been provided on the front side of the diffuser 91, it can, if desired, be provided on the rear side of the diffuser. It has been found that the convex spherical surfaces helps to maintain the sensitivity of the detector as the beam moves away from the center by a combination of two effects, one being that the curvature produces a lens effect that tends to direct the beam towards the detector and the other being that the decreasing thickness of the diffusing material towards the outer margin permits increased amounts of energy to reach the detector to compensate for the drop off in sensitivity towards the outer margins of the aperture for the detector.

The front extremity of sleeve 88 is provided with a pair of flanges 101 and 102 which define an annular recess between the same. The U-shaped cradles which are formed in the bracket 28 are adapted to seat within the recess 103 provided by the flanges 101 and 102. A pin 104 is provided to retain the detector assembly within the cradle. A plate 106 is pivotally mounted on a screw 107 extending through the flanges 101 and 102. An abutment plate 108 is carried by the front of the sleeve 88 and is adapted to limit movement of the plate 106 between an out-of-the-way position shown in FIG. 3 and a position in which it covers the aperture 109 provided in the sleeve. The plate 106 can be moved into these positions by use of a handle 110. The plate 106 is provided with a white bulls-eye 111 which has a small hole 112 in the center of the same. This makes it possible to readily see the visible beam on the white surface and aim it quite accurately. It is also possible to aim some of the infrared beam through the hole and this can be aimed very accurately by seeking the highest intensity of the beam.

The mirror assembly 68 consists of a frame 116 which carries a gimballed mirror 117, the tilt of which can be changed by leveling screws (not shown) through knurled adjustment knobs 118 and 119. A plate 121 which is provided with a handle 122 is mounted on the frame 116 in the same manner that the plate 106 is mounted in the detector assembly. It is also provided with a bulls-eye and a small hole 112 in the same manner as the plate 106.

Operation and use of the photometric testing apparatus may now be briefly described as follows. Let it be assumed that the test part 71 is mounted on the carriage as shown in FIG. 1. The test part 71 which is shown in FIG. 1 is a relatively large part and can be just placed on the carriage. However, it should be appreciated that for smaller parts, a suitable fixture can be provided on the carriage for holding the part in the desired position.

Let it be assumed that the hand wheel 32 is rotated to move the test 71 part so that it is out of the path of the coaxially combined beams 36 and 51. The movable mirror assembly 68 is positioned on the bracket 28 and is positioned so that the combined beams 36 and 51 are directed by it and reflected back onto the mirror 67 which directs the reflected combined beams into the signal detector assembly 30. The output from the signal detector 30 is compared with the output from the reference detector 29 by the use of conventional electronics to obtain a setting for 100% sensitivity. Both of the beams 36 and 51 are continuously directed to the reference detector 29 and should not vary whereas the combined beams directed to the signal detector 30 depend upon whether or not a test part is in the path of the combined beams received by the detector assembly 30.

In making measurements with the test part either out of the beam or with the test part in the beam, the invisible beam must be carefully aimed. To facilitate aiming of the invisible beam, both detector assemblies 29 and 30 and the mirror assembly 68 are provided with a bulls-eye 111 to facilitate aiming of the visible beam. By making the beams 36 and 51 coaxial, it is possible to align the invisible infrared beam 51 by lining up the visible beam 36. Thus it can be seen that when the visible beam is lined upon a bulls-eye 111, the invisible beam also should be lined up. The visible beam 36 has an additional function in that since it is readily visible, the operator of the instrument knows the location of the invisible beam and therefore would be alerted to the fact that he should take care that the invisible beam should not strike one of his eyes and possibly damage the same. By way of example, the beam 36 could be a bright ruby or red beam which is very visible and harmless by itself.

After the beams have been properly aimed on the mirror assembly 68 and on the reference detector assembly 29 and the signal detector assembly 30, a reading for 100% sensitivity can be readily obtained.

Thereafter, the hand wheel 32 is rapidly operated to move the test part 71 so that it is moved into the combined beams 36 and 51. If a transmission measurement is to be made, the movable mirror assembly 68 is retained on the bracket 28 on protractor 23. However, if a reflectance measurement is to be made, the movable mirror assembly 68 is moved over to the bracket 27 where it is carried by the other protractor 22. Assuming that a transmission measurement is to be made, the protector 23 is offset by an angle to compensate for the offset of the beam by refraction through the thick glass test part 71. This angle can be calculated but it also can be accomplished by merely using the bulls-eye carried by the mirror assembly 68 and positioning the movable mirror assembly 68 so that the beams 36 and 51 will then strike the bulls-eye in the same position. When making such a transmission measurement, it can be seen that the combined beams will impinge upon the test part and pass through the test part 71 and strike the mirror 117 carried by the mirror assembly 68. The beams will then be reflected back through the test part 71 so that the combined beams go through the test part twice after which they strike the mirror 67 and are reflected onto the signal detector 30. The signal detector 30 will then immediately give a reading in comparison to the reading which is obtained when no test part is in the combined beams 36 and 51 to give a measurement of the transmission of the test part.

Since the test part is carried by a movable carriage, it is possible to make the measurements in rather quick succession merely by operating the hand wheel 32. Making the measurements in quick succession, assures that there will be a minimal drift in the electronic system which is utilized. In making the successive measurement, it is merely necessary to aim the combined beams. As explained previously, this is facilitated by the use of the bulls-eye targets carried by the detector assemblies 29 and 30 and the mirror assembly 68.

In making a reflectance measurement, the mirror assembly 68 is shifted from the bracket 28 to the bracket 27 and the other protractor 22. The same alignment procedure is carried out with the test part 71 in the combined beams 36 and 51. In this case, the combined beams 36 and 51 will impinge upon the test part 51 and the portions of the beams 36 and 51 reflected thereby will be directed onto the mirror 117 carried by the mirror asembly 68 which will reflect the combined beams back onto the test part where they will be reflected onto the mirror 67 and directed into the detector assembly 30 to give a measurement of the reflectivity of the test part.

In makig the transmission and reflection measurements hereinbefore described, the change in the signal level received from the signal detector assembly 30 is a measure of the transmissivity of the test object or the reflectivity of the test surface of the test object which is being measured. For example, if 1% of the infrared or invisible beam 51 is lost at each reflection, the signal produced by the signal detector assembly 30 will be 98% of what it was prior to insertion of the test part 71 into the combined beams 36 and 51. The signal output from the signal detector assembly 30 will be relative to the signal which is received from the reference detector assembly 29. Any temporal variation in the main reference beam 51 is eliminated by using the ratio of the two signals from the reference detector assembly 29 and the signal detector assembly 30.

The testing apparatus of the present invention has many important applications. It is particularly important in making measurements on laser coatings which must have low loss particularly in high power laser applications. In fact, to ensure that laser coatings will have a relatively long lifetime it is essential that the transmission and reflectance be very close to 100% because any deviation from the 100% represents losses which are likely to cause heating of the surfaces of the laser coating and destroy the same. The testing apparatus also can have applications in which it is desired to scan the entire part. By using the output of the testing instrument and correlating the same with the position of the beam, on the test part, curves can be drawn by a plotter which show the variation in reflectance or transmittance at each particular point in the part. This makes it possible to find variations in the reflectance or transmission in the part which makes it possible to ascertain whether or not the parts meet specifications.

By the use of the diffusers 91 and 97 in the detector assembly, it is possible to obtain very accurate measurements even though the detectors have variations in sensitivity over their sensing areas. By way of example, a detector was utilized having a diameter of 1/10 of an inch. With this was used a diffuser of 1-inch diameter formed from a plurality of discs approximately ⅛ of an inch thickness. Four of the discs were placed together to form the diffuser 91 with the front surface of one of the discs being machined to have a spherical curvature of a sphere having a diameter of 1.25 inches. The other diffuser 97 consisted of one disc having a thickness of ⅛ of an inch. By utilizing such configuration of diffusers it has been found that it is possible to obtain accuracy in the measured reflectance of transmittance within approximately 1/50 of 1%.

In making measurements with the testing apparatus hereinbefore described, the energy received by a detector is compensated by the diffuser for the fall off in sensitivity of the detector at its outer margins. Also as pointed out above, the curvature of the diffuser produces a lens effect which tends to direct the beam towards the detector which is centrally disposed with respect to the lens. A portion of the diffuser is placed in close proximity to the detector so that the detector will be less direction sensitive. The shaped diffuser also has the advantage in that it makes aiming of the laser beam less critical. The coaxial combination of the invisible laser beam used for the photometric measurement with the visible laser beam is for the specific purpose of aiding in aiming of the invisible beam and also for indicating the location of the invisible laser beam. The accuracy of the measurements which are made with the photometric testing apparatus is greatly aided by the fact that the invisible beam can be aimed in a precision manner by the use of the coaxial visible beam.

The fixed ratio splitting of the invisible laser beam for reception by the reference and test detectors makes it possible to eliminate the effect of temporal variations in the beam intensity. Since the test part is mounted on a movable carriage, it expediently can be moved into and out of the beam. This makes it possible to make the two measurements that are required for the determination of transmission or reflection of the test part in quick succession. The first measurement is made with the test part out of the invisible beam and the second mesurement is made with the test part in the invisible beam. The invisible beam is separately aimed for each of the two measurements. Making the measurements in quick succession assures minimal drift in the electronic system which is utilized in conjunction with the photometric testing apparatus. The visible laser beam makes accurate aiming possible particularly in view of the fact that the shaped diffuser reduces the requirement for accuracy of aiming. Although the present invention has been described principally in conjunction with laser beams, it should be appreciated that the invention can also be utilized with other light beams with ill-defined energy distributions.

What is claimed is:

1. In a testing apparatus for making photometric measurements, means producing a light beam having a spatially ill-defined energy distribution, a detector for receiving the light beam and having spatial variations in sensitivity over its sensing area, and a diffuser intersecting the full light beam before it strikes the detector of and being formed differing thicknesses to compensate for drop-off in detector sensitivity for rays from the beam striking the diffuser away from the center of the detector.

2. Apparatus as in claim 1 wherein said diffuser has a thickness which decreases progressively towards the outer margins thereof.

3. Apparatus as in claim 2 wwherein said diffuser is formed of a white-like plastic.

4. Apparatus as in claim 1 wherein said light beam is an invisible laser beam together with means for producing a visible light beam and means for combining the visible light beam and the invisible light beam so that they are coaxial prior to being received by the detector.

5. Apparatus as in claim 4 together with means for aiming the combined invisible and visible light beams, said last named means including means forming a bulls-eye upon which the visible light beam can be aimed.

6. In a testing apparatus for making photometric measurements, means producing a light beam having a spatially ill-defined energy distribution, a detector for receiving the light beam and having spatial variations in sensitivity over its sensing area, a diffuser intersecting the full light beam before it strikes the detector and being formed to compensate for drop-off in detector sensitivity for rays from the beam striking the diffuser away from the center of the detector and an additional diffuser mounted in close proximity to the detector so as to decrease the direction sensitivity of the detector.

7. Apparatus as in claim 6 together with a band pass filter mounted between the first and second named diffusers.

8. Apparatus as in claim 7 whereinsaid band pass filter is in relatively close proximity to the second named diffuser.

9. In a testing apparatus for making photometric measurements on a test part, means for producing an invisible light beam, means for producing a visible light beam, means for combining the visible and invisible light beams so that they are coaxial, a reference detector characterized in that its sensitivity varies spatially over its sensitive area, means for aiming the combined visible and invisible light beams before they impinge upon the test part onto the reference detector, a signal detector characterized in that its sensitivity varies spatially over its sensitive area, means for aiming the combined visible and invisible beams so that they impinge upon the test part and means for directing the visible and invisible beams onto the signal detector after they have impinged upon said test part so that a comparision can be made from the output from the reference detector and the output from the signal detector to determine the manner in which the invisible beam is affected by impingement of the test part and diffuser means interposed in the path of the combined beams so that the combined beams pass through the diffuser means before impinging upon the reference and signl detectors, said diffuser means being formed with differing thicknesses in a direction parallel to the direction of passage of the combined beams through the diffuser means to compensate for the spatial variation in sensitivity of the reference and signal detectors.

10. Apparatus as in claim 9 together with means for moving the test part into and out of the combined beams so that measurements can be made with the test part out of the combined beams and in the combined beams.

11. Apparatus as in claim 9 wherein said diffuser means is formed so its thicknesses decreases progressively towards the outer edges.

12. Apparatus as in claim 11 wherein said diffuser means is formed of a white-like plastic.

13. Apparatus as in claim 9 wherein the means for directing the visible and invisible beams includes a movable mirror assembly.

14. Apparatus as in claim 13 wherein the detectors and the movable mirror assembly are mounted in such a manner that the transmissivity of the test part can be measured.

15. Apparatus as in claim 13 wherein the detectors and the movable mirror are mounted so that the reflectivity of a surface of the test part can be measured.

16. Apparatus as in claim 13 together with means for aiming the combined beams and wherein said means for aiming includes means for forming a bulls-eye associated with each of the detectors and the mirror assembly onto which the visible light beam can be aimed.

* * * * *